United States Patent
Balsells

[11] Patent Number: 5,979,904
[45] Date of Patent: Nov. 9, 1999

[54] ROTARY RECIPROCATING SEALS WITH EXTERIOR METAL BAND

[75] Inventor: Peter J. Balsells, Santa Ana, Calif.

[73] Assignee: Bal Seal Engineering Company, Inc., Santa Ana, Calif.

[21] Appl. No.: 08/990,079

[22] Filed: Dec. 12, 1997

[51] Int. Cl.$^6$ ....................................................... F16J 15/32
[52] U.S. Cl. ..................... 277/554; 277/564; 277/566; 277/569; 277/572; 277/575
[58] Field of Search ..................... 277/564, 566, 277/554, 569, 572, 575, 589

[56] References Cited

U.S. PATENT DOCUMENTS

| | | | |
|---|---|---|---|
| 2,635,907 | 4/1953 | Heimbuch . | |
| 3,346,265 | 10/1967 | Rhoads et al. | 277/554 |
| 4,655,462 | 4/1987 | Balsells | 277/467 |
| 5,265,890 | 11/1993 | Balsells | 277/467 |
| 5,326,112 | 7/1994 | Paykin | 277/575 |

FOREIGN PATENT DOCUMENTS 3326-811  2/1985  Germany ................................ 277/572

*Primary Examiner*—Chuck Y. Mah
*Assistant Examiner*—Alison K. Pickard
*Attorney, Agent, or Firm*—Walter A. Hackler

[57] ABSTRACT

A seal assembly is provided for rotary and reciprocating sealing between a shaft and a housing. The seal assembly includes a seal ring in the shape of an annulus having a body portion with an inside flange and an outside flange extending longitudinally therefrom. A body portion of the seal ring has a smooth cylindrical exterior surface and the seal ring is formed from a compressible moldable material. A spring is provided and disposed between the flanges for outwardly biasing the flanges from one another to enable sealing between the shaft and the housing. A band is provided and disposed externally around the body portion for holding the seal ring within the housing. A bond is provided between the band and the seal ring by way of striations and grooves which enable the seal ring material to compressibly mold into the band to provide a bond therebetween.

20 Claims, 2 Drawing Sheets

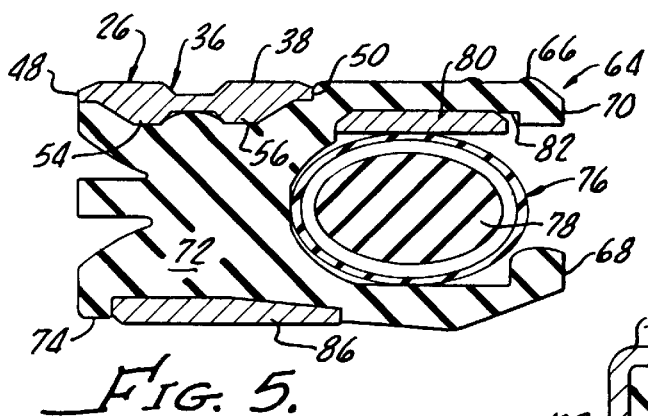
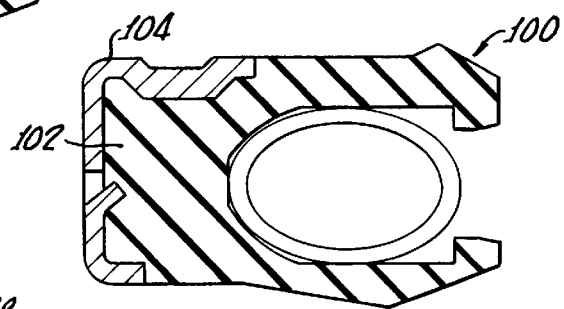
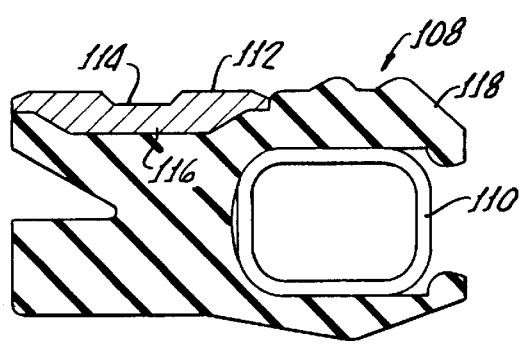
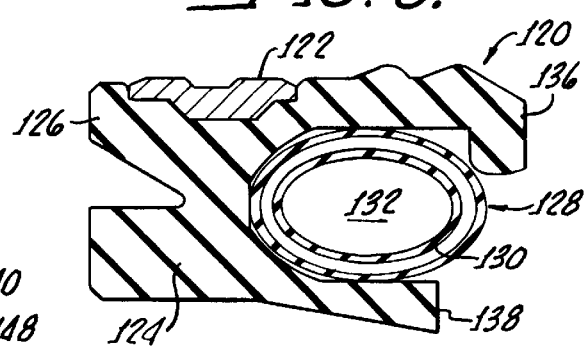
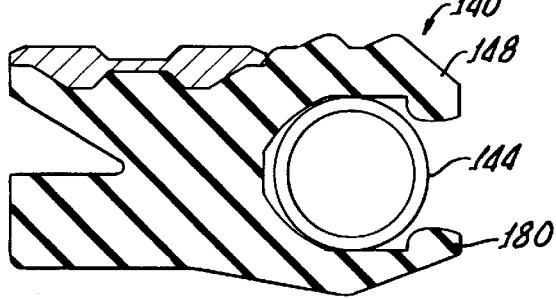
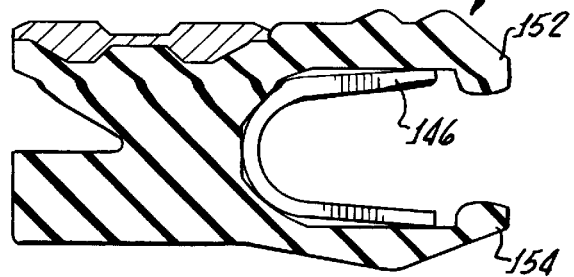

ROTARY RECIPROCATING SEALS WITH EXTERIOR METAL BAND

The present invention is generally directed to seal assemblies and is more particularly directed to rotary, reciprocating seals.

Bearing seals are often subjected to varying conditions of pressure, temperature, as well as specific exposure to acidic or caustic materials. With particular reference to high pressure and temperature conditions, rotary and reciprocating seals have been fitted with external metal bands in order to seat the seal assembly between a housing and a shaft.

In order to assure adhesion between the metallic band and any elastomeric sealing material, metal bands have been molded with an elastomer having a very large cross section. This was necessary in order to provide added flexibility to the elastomeric seal for minimizing and reducing transmitted forces caused when one press fit the seal assembly into a housing.

Proper sealing is required between a seal inside diameter, typically abutting a rotating shaft, and a seal outside diameter against a housing. In this configuration, the seal inside diameter must provide a dynamic seal against the shaft and the seal outside diameter must provide a static seal against the housing.

Because of the differences between the dynamic and static sealing requirements, it is preferable that the dynamic inside diameter seal be isolated from the outside static field. Consequently, larger cross sections of the seal, measured from the outside to inside diameter, have been desired in order to create this isolation with the net effect of reducing the force and torque acting on the seal.

Unfortunately, assembly of the seal between the housing and the shaft, by forcing the seal outside diameter into the housing, can transmit a force to the inside diameter of the seal. This affects friction, torque, seal wear and seal life.

Heretofore, large cross section elastomers were necessary in order to provide sufficient depth therein in order to mold an exterior band or ring.

The present invention is directed to a seal assembly having a circular metal ring which can be mechanically locked to an elastomeric seal ring to form a single unit capable of withstanding various conditions of pressure, shaft speed, and temperature in reciprocating and/or rotary applications.

SUMMARY OF THE INVENTION

In accordance with the present invention, a seal assembly suitable for providing rotary and/or reciprocating sealing between a shaft and a housing generally includes a seal ring in a shape of an annulus having a body portion with an inside flange and outside flange extending longitudinally therefrom. The outside flange is designed for providing static sealing between the seal ring and the housing and the inside flange is designed for providing dynamic sealing against a rotating or reciprocating shaft.

The body portion of the ring has a smooth cylindrical exterior surface and importantly the seal ring is formed from a compression moldable material. More particularly, the compression moldable material may be polytetrafluoroethylene or an ultra high molecular weight polyethylene.

A spring is provided and disposed between the flanges for outwardly biasing the flanges from one another in order to enable the sealing between the shaft and the housing hereinabove noted.

A band, disposed externally around the body portion exterior surface, provides a means for holding the seal ring within the housing, reducing distortion of the seal ring within the housing and, importantly, preventing a rotation of the seal ring within the housing. This is effected by way of interior groove means for engaging the body portion exterior surface in order to compressively mold the body portion exterior surface into the groove. This is possible because materials like polytetrafluoroethylene and ultra high molecular weight polyethylene flow under constant application of force. A continuous and steady force allows the material to move and such movement causes full engagement with the band.

In addition, exterior groove means on the band are provided for increase in the flexibility of the band in order to accommodate for out of roundness between the seal ring and the shaft. Further, the band means has a maximum outside diameter less than an outside diameter at the outside flange in order to enable independent sealing between the outside flange and the housing.

Still more particularly the seal assembly, in accordance with the present invention, provides for interior groove means having circumferential recess means, disposed between ends of the band means, for forming a circumferential cavity for receiving the compression molded material displaced by joint depending portions of the band means in order to axially lock the band means into the seal ring.

In other words, as the band means and the seal ring are assembled, sufficient force is applied on the inside diameter of the seal to make it flow into the circular, or circumferential, grooves so that material is displaced into the metal rings and thereby prevent axial movement between the band means of the plastic ring.

Further, the interior groove means includes longitudinal striation means, disposed between the recess means and the ends of the band means, for radially locking the band means to the seal ring. Again, by applying sufficient force on the inside diameter of the seal ring, it flows into the striation means, or axial grooves, so that material is displaced into the striation means in order to prevent rotational movement between the ring seal and the band means.

In one embodiment of the present invention, the band means may have an end flush with an end of the seal ring body portion. In yet another embodiment of the present invention, a secondary ring means may be provided and disposed on an inside circumference of the ring seal for supporting the ring seal and reducing extrusion of the ring seal under conditions of high pressure and high shaft speed.

Further, in yet another embodiment of the present invention, a second band means may be provided and disposed between the spring means and the outer flange for supporting the outer flange in order to reduce shrinkage of the ring seal outer flange due to elevated temperature and, further, for evening a force transmission between the spring means and the outer flange.

Preferably, the ring means is formed of metal and in another embodiment of the present invention, the band means may be disposed around an end of the ring end body portion.

BRIEF DESCRIPTION OF THE DRAWINGS

The advantages and features of the present invention will appear from the following description, when considered in conjunction with the accompanying drawings, in which:

FIG. 5 is an alternative embodiment of the present invention further showing a secondary ring means and a second band means;

FIG. 6 is an alternative embodiment of the present invention in which the band means is shown encompassing an end of the ring seal;

FIG. 7 an alternative embodiment of the present invention which does not include a circular undercut;

FIG. 8 is an alternative embodiment of the present invention showing the band means being disposed in a spaced apart relationship with an end of the ring seal;

FIG. 9 another embodiment of the present invention showing an alternative spring arrangement; and FIG. 10 is yet another embodiment of the present invent in showing it and other spring means suitable for use in the present invention.

DETAILED DESCRIPTION

Figure 1:
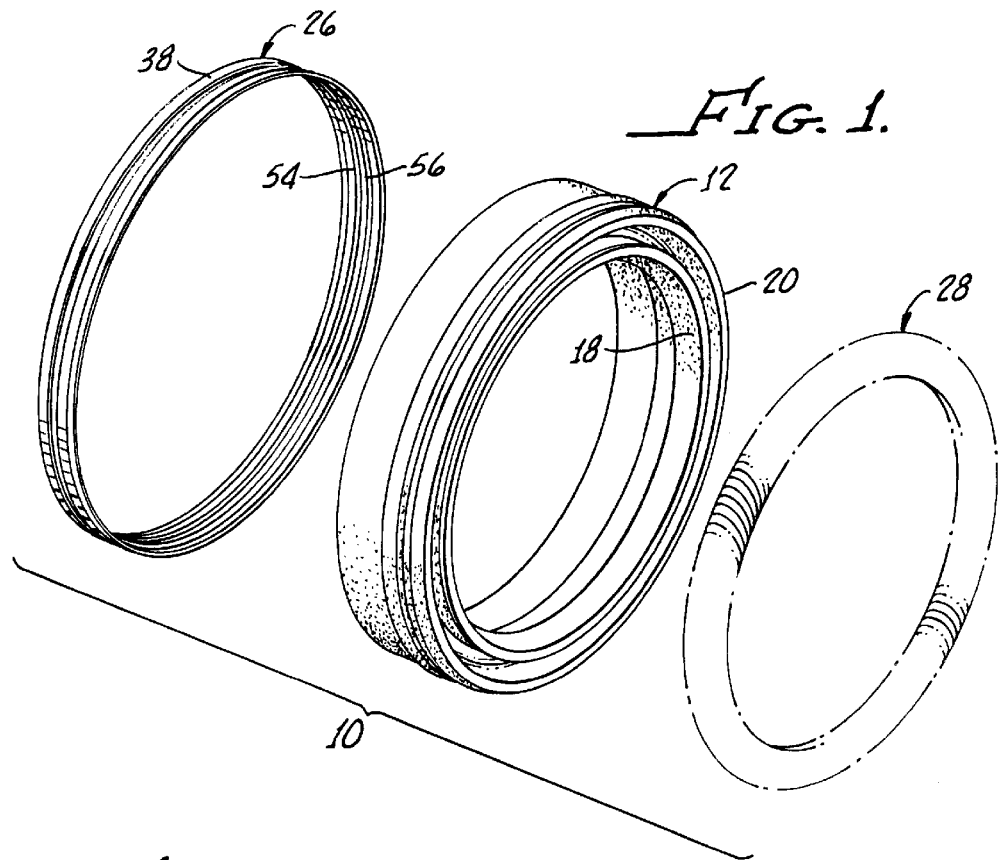
FIG. 1 As an exploded perspective view of the present invention generally showing a seal ring, spring means and band means.

Turning now to FIG. 1, there is shown a seal assembly 10 in accordance with the present invention, suitable for providing rotary and/or reciprocating sealing between a shaft (not shown) and a housing (not shown).

Figure 2:
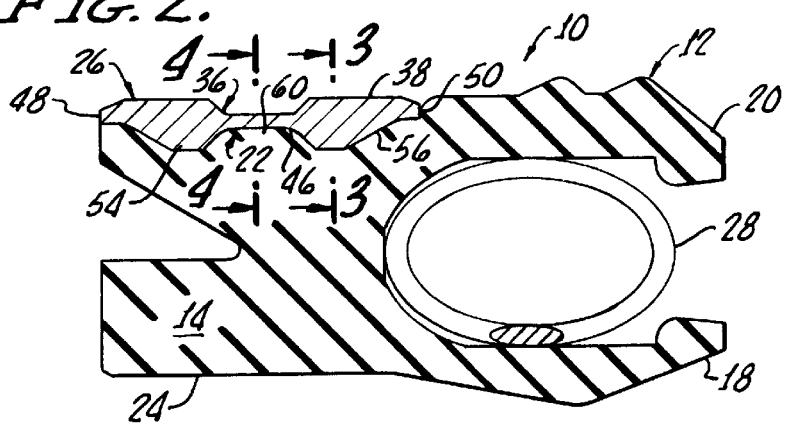
FIG. 2 is a cross sectional view of the embodiment shown in FIG. 1.

Generally, the seal assembly 10 includes a seal ring 12 in the shape of an annulus having a body portion having an inside flange 18 and an outside flange 20 extending longitudinally from the body portion 14. As shown in FIG. 2, the body portion 14 has a smooth cylindrical exterior surface 24.

As hereinabove noted, it is important that the seal ring be formed from a compression moldable material so that deformation of the body portion occurs upon the assembly and cold flow properties are provided so that the ring seal 12 flows easily and locks into an exterior band 26 as hereinafter described in greater detail.

A spring 28 which may be a canted coil spring disposed between the flanges 18, 20, provides a means for outwardly biasing the flanges 18, 20 from one another to enable sealing between the shaft (not shown) and the housing (not shown).

The band 26, disposed externally around the body portion exterior surface 24 provides a means for reducing distortion of the seal ring within the housing as it is inserted therein, in addition to preventing rotation of the seal ring within the housing, as hereinafter described in greater detail. In addition, the band 26 includes interior groove means 22 for engaging the body portion exterior surface 24 in order to compressively mold the body a portion 14, by way of its exterior surface 24, into the groove means 22.

As more clearly shown in FIG. 2, the band 26 has a maximum outside diameter less than an outside diameter of the outside flange 20, to prevent any interference of a seal between the outside flange 20 and the housing.

Importantly, exterior groove 36 is formed on an exterior surface 38 of the band 26 in order to increase flexibility of the band 26 to accommodate for out-of-roundness between the seal ring 12 and the shaft.

This exterior groove 36 importantly reduces the transmissibility of force when press fitting the seal assembly 10 into the housing. This, in turn, allows lower transmission of force and at the same time maintains that force with the many variations that may exist to the tolerances, eccentricities, and out-of-roundness present within the sealing shaft, thus maintaining the variation in torque between the seal and the shaft within plus or minus 30%. This is a significant improvement of prior bearing seals such as, for example, shown in U.S. Pat. No. 4,655,945 to Peter J. Balsells.

In this referenced patent, the wall thickness at the minimum point of the metal ring was approximately 0.018 inches. In the case of the present application, the minimum thickness of the metal ring is about 0.003 inches. The referenced patent is also an example of a metal band being molded into a plastic ring, such molding being found unsatisfactory to prevent rotation of a plastic ring independent of the metal ring.

Figure 3:
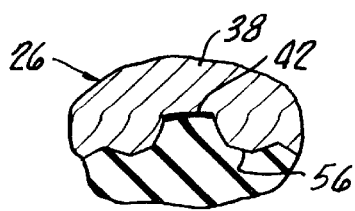
FIG. 3 is a sectional view taken along the line 3—3 of FIG. 2.

Importantly, and as most clearly shown in FIG. 3, the band 26 includes striations, or longitudinal grooves 42, which enable the seal ring 12 to flow thereinto which prevents rotational movement between the band 26 and the seal ring 12.

The polytetrafluoroethylene (PTFE) or ultra high molecular weight polyethylene from which the seal ring is formed advantageously has cold-flow properties so that the body portion 14 of the seal ring 12 flows into the longitudinal grooves 42, thereby locking the seal ring 12 to the band 26. It should be noted, however, that a certain degree of recovery occurs, however, even if the recovery of the PTFE is in the neighborhood of 30–50%, sufficient contact between the body portion 14 and the grooves 42 prevent any rotational movement therebetween.

The groove means 22 further include a circumferential recess, or groove 46, disposed between ends 48, 50, which forms a circumferential cavity between the ends 48, 50, for receiving compression foldable material displaced by the adjoining depending portions 54, 56.

Figure 4:
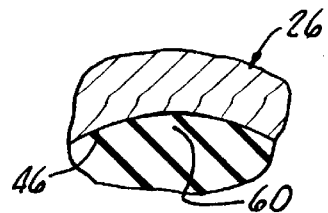
FIG. 4 is a sectional view taken along the line 4—4 of FIG. 2.

Thus, after assembly, the PTFE portion 60, now disposed between the depending portions 54, 56 of the band 26, axially lock the band 26 to the seal ring 12. A cross sectional view of this area is shown in FIG. 4.

Turning now to FIG. 5, there is shown an alternative embodiment 64 of a seal assembly in accordance with the present invention generally showing a seal ring 66 having flanges 68, 70 longitudinally extending from a body portion 72, a metal band of 26 is disposed around a circumference 74 of the body portion 72 and it should be appreciated that all character references identifying portions of the band 26 are identical to those shown in FIG. 2.

In this instance, a spring 76 disposed between the flanges 68, 70, provides bias fortune as hereinabove described in connection with the seal assembly 10 shown in FIG. 2. The spring may be loaded with a solid center 78 formed of an elastic for further tailoring the biasing characteristics of the spring 76.

In addition, secondary band means 80, which may be formed of metal, is disposed on an inside circumference 82 between the spring 76 and the outside flange 70 of the ring seal 66 for supporting the ring seal 66 and reducing extrusion of the ring seal 66 under conditions of high pressure and high shaft speed. Further, the secondary band 80 enables the flange 70 to be of narrower cross section, for example, as that shown in the flange 20, shown in FIG. 2. This further reduces the cross section of the seal assembly 64 and enables a greater independent sealing provided by the flange 70 in a static relationship to the housing from the seal provided by the flange 68 against the shaft.

In addition, the embodiment 64 may include ring means 86, which may be formed from a hard plastic or metal which provides for supporting the ring seal 66 and reducing extrusion of the ring seal 66 under conditions of high pressure and high shaft speed.

FIG. 6 shows an alternative embodiment 100 in accordance with the present invention having a body portion 102 with a band 104 disposed therearound in order to provide greater support therefor.

As shown in FIG. 7, a seal assembly 108 may include a rectangular spring 10 along with a band 112 having an exterior groove 114 with an inside portion 116 without a recess 46 (see FIG. 2) which provides longer support between the seal ring 118 which, with striations as shown in FIG. 3, provide greater resistance to rotational movement between the band 112 and the seal ring 118 in applications where reciprocating forces may be lower.

As shown in FIG. 8, a seal assembly 120 includes a band 122 disposed on a body portion 124, with the band being disposed in a spaced apart relationship with an end 126 about a body portion 124. This embodiment 120 may be used alternatively to ensure axial coupling between the band 122 and the body portion 124. Also shown in FIG. 8 is an alternative spring embodiment 128 which includes an O ring 130 therein with a hollow center 132 which provides a means for controlling sealing forces on the flanges 136, 138.

FIGS. 9 and 10, respectively, show embodiments 140, 142, similar in design to the embodiment 10 shown in FIG. 2 utilizing in the case of embodiment 140 shown in FIG. 9, a helical (ribbon, spring 144) and in the case of embodiment 142 shown in FIG. 10, a V (flat) spring 146. Each being used to tailor the biasing of the flanges 148, 150, 152, 154, respectively.

Although there has been hereinabove described a specific arrangement of a seal assembly, in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. A seal assembly comprising:
   a seal ring in the shape of an annulus having a body portion with an inside flange and an outside flange extending longitudinally therefrom, said body portion having a smooth cylindrical exterior surface, said seal ring being formed from a compression moldable material;
   spring means, disposed between the flanges, for outwardly biasing the flanges from one another to cause sealing between a shaft and a housing;
   band means, disposed externally around the body portion exterior surface, for holding the seal ring within the housing, reducing distortion of the seal ring within the housing, and preventing rotation of the seal ring within the housing, said band means comprising interior groove means, with adjoining depending portions for engaging the body portion exterior surface in order to compressively mold the body portion exterior surface into the groove means, and exterior groove means for increasing flexibility of the band means in order to accommodate for out-of-roundness between the seal ring and the shaft, said interior and exterior groove means being aligned with one another to define a narrowed portion of said band means, said band means having a maximum outside diameter less than an outside diameter of the outside flange.

2. The seal assembly according to claim 1 wherein said interior groove means comprises circumferential recess means, disposed between ends of said band means and forming a circumferential cavity, for receiving the compression moldable material displaced by the adjoining depending portions of said band means in order to axially lock the band means to the seal ring.

3. The seal assembly according to claim 2 wherein said interior groove means comprises longitudinal striation means, disposed between the recess means and the ends of said band means, for radially locking the band means to the seal ring.

4. The seal assembly according to claim 3 wherein one end of said band means is flush with an end of the seal ring body portion.

5. The seal assembly according to claim 3 further comprising ring means, disposed on an inside circumference of said ring seal, for supporting said ring seal and reducing extrusion of said ring seal under conditions of high pressure and high shaft speed.

6. The seal assembly according to claim 5 further comprising second band means, disposed between said spring means and the outer flange, for supporting the outer flange, in order to reduce shrinkage of the seal ring outer flange due to elevated temperature and for evening face transmission between the spring means and the outer flange.

7. The seal assembly according to claim 5 wherein said ring seal comprises polytetrafluoroethylene.

8. The seal assembly according to claim 7 wherein said band means comprises a metal.

9. The seal assembly according to claim 6 wherein said ring seal comprises polytetrafluoroethylene and said second band means comprises a material harder than polytetrafluoroethylene.

10. The seal assembly according to claim 1 wherein said band means is disposed around an end of the seal ring body portion.

11. A seal assembly comprising:
    a shaft;
    a housing;
    a seal ring in the shape of an annulus having a body portion with an inside flange and an outside flange extending longitudinally therefrom, said body portion having a smooth cylindrical exterior surface, said seal ring being formed from a compression moldable material;
    spring means, disposed between the flanges, for outwardly biasing the flanges from one another to cause sealing between the shaft and the housing;
    band means, disposed externally around the body portion exterior surface, for holding the seal ring within the housing, reducing distortion of the seal ring within the housing, and preventing rotation of the seal ring within the housing, said band means comprising interior groove means, with adjoining depending portions, for engaging the body portion exterior surface in order to compressively mold the body portion exterior surface into the groove means, and exterior groove means for increasing flexibility of the band means in order to accommodate for out-of-roundness between the seal ring and the shaft, said interior and exterior groove means being aligned with one another to define a narrowed portion of said band means, said band means having a maximum outside diameter less than an outside diameter of the outside flange.

12. The seal assembly according to claim 11 wherein said interior groove means comprises circumferential recess means, disposed between ends of said band means and forming a circumferential cavity, for receiving the compression moldable material displaced by the adjoining depending portions of said band means in order to axially lock the band means to the seal ring.

13. The seal assembly according to claim 12 wherein said interior groove means comprises longitudinal striation means, disposed between the recess means and the ends of said band means, for radially locking the band means to the seal ring.

14. The seal assembly according to claim 13 wherein one end of said band means is flush with an end of the seal ring body portion.

15. The seal assembly according to claim 13 further comprising ring means, disposed on an inside circumference of said ring seal, for supporting said ring seal and reducing extrusion of said ring seal under conditions of high pressure and high shaft speed.

16. The seal assembly according to claim 15 further comprising second band means, disposed between said spring means and the outer flange, for supporting the outer flange, in order to reduce shrinkage of the seal ring outer flange due to elevated temperature and for evening face transmission between the spring means and the outer flange.

17. The seal ring assembly according to claim 15 wherein said ring seal comprises polytetrafluoroethylene.

18. The seal assembly according to claim 17 wherein said band means comprises a metal.

19. The seal assembly according to claim 18 wherein said said ring seal comprises polytetrafluoroethylene and said second band means comprises a material harder than polytetafluoroethylene.

20. The seal assembly according to claim 11 wherein said band means is disposed around an end of the seal ring body portion.

* * * * *